M. A. SMITH.
BEET TOPPING MACHINE.
APPLICATION FILED OCT. 14, 1918.
1,344,966.
Patented June 29, 1920.
2 SHEETS—SHEET 2.
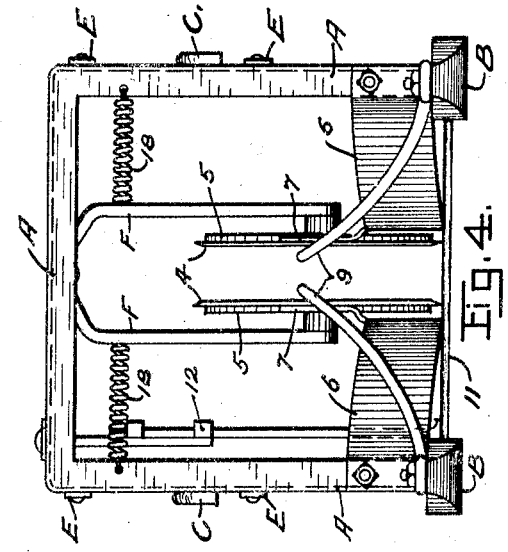
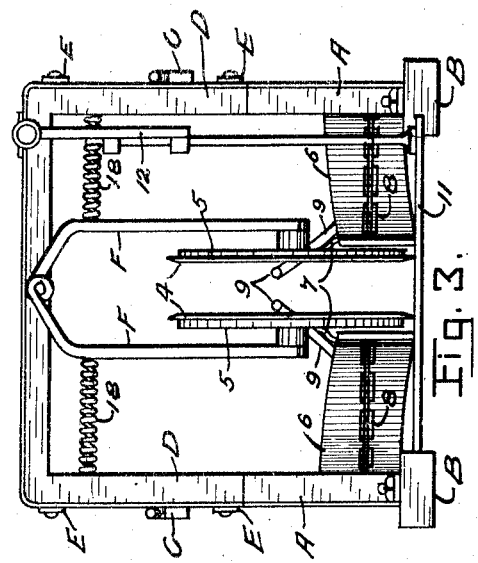
Marion R. Smith
INVENTOR.
BY J. M. Thomas
ATTORNEY

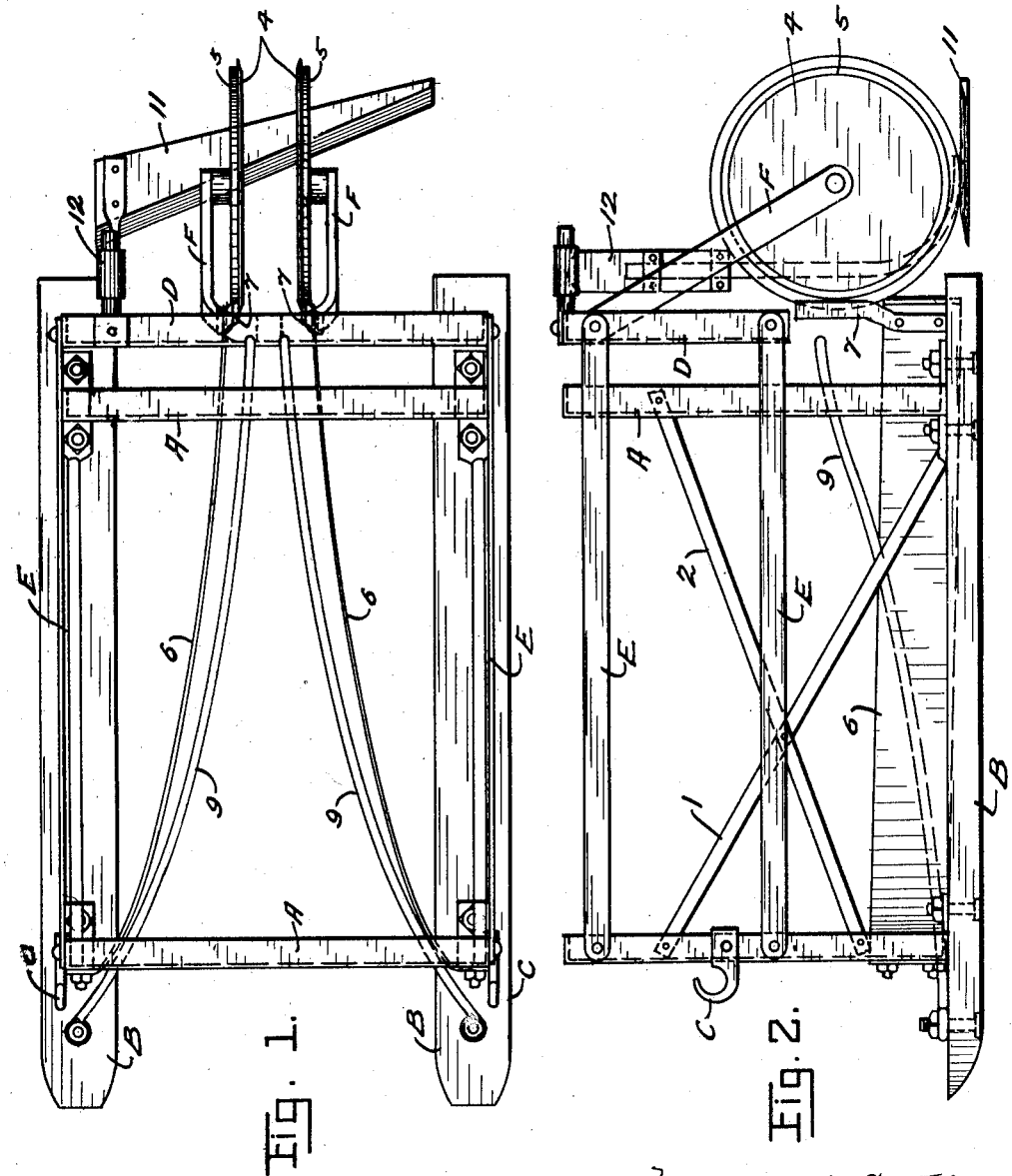

UNITED STATES PATENT OFFICE.

MARION A. SMITH, OF SALT LAKE CITY, UTAH, ASSIGNOR TO LIBERTY BEET TOPPER COMPANY, OF SALT LAKE COUNTY, UTAH, A CORPORATION.

BEET-TOPPING MACHINE.

1,344,966.   Specification of Letters Patent.   Patented June 29, 1920.

Application filed October 14, 1918. Serial No. 257,942.

*To all whom it may concern:*

Be it known that I, MARION A. SMITH, a citizen of the United States, residing at Salt Lake City, in the county of Salt Lake and State of Utah, have invented certain new and useful Improvements in Beet-Topping Machines, of which the following is a specification.

My invention relates to beet topping machines and has for its object to provide a machine which may be attached to and precede a beet digging plow and be drawn over a row of matured beets to cut the foliage from the body of the beets and which will automatically adjust the knife to the lateral as well as the vertical position to top the beet at the desired place.

These objects I accomplish with the machine illustrated in the accompanying drawings in which similar letters and numerals of reference indicate like parts throughout the several figures and as described in the specification forming a part of this application and pointed out in the appended claims.

In the drawings in which I have shown a substantial embodiment of my invention Figure 1 is a plan view of the device. Fig. 2 is a side elevation of the same. Fig. 3 is a rear elevation of the machine. Fig. 4 is a front elevation of the same. Fig. 5 is an elevation in detail of one of the legs of the control member.

As beets are grown in the ground they will not be found in a straight row, neither will they grow in the same vertical plane but will be found to vary in their lateral position from a straight row to either side as much as three or four inches and the crown of the beets will also be found to vary in size and vertical position relative to the top of the soil as much as two inches or more. It has been one of the problems of topping beets to adjust the machine laterally and vertically to meet these conditions and the present invention does this by providing means to guide the machine laterally over and along the row of beets and to raise or lower the topping knife and adjust it vertically in relation to the individual beet as the machine passes that beet by providing a rectangular frame made by securing two inverted U-shaped angle iron pieces A together by the angled stays 1 and 2 and mounting them on two runners B, which frame and runners are to be attached to a tongue projecting past them from the front of the frame of the beet digging means by the hooks C.

Another U-shaped angle iron frame D is hinged to the front one of said frames A by the horizontally disposed reaches E. Medially on said frame D are swivelly mounted the controller members F which consist of two curved irons hinged together to form a U-shaped iron to the legs of which are journaled the vertically mounted disks 4. Each of said disks has a laterally projecting flange 5 thereon which flange bears on the crown of the beet as said disks are drawn over the beet while the peripheral edges of said disks 4 cut into the crown of the beet. A lateral control of said disks is provided consisting of two opposed flat springs 6 bent into a curve and one end of each of which is secured to the front one of said frames A, while on the rear end of each of said springs 6 is secured a guide standard 7 the upper portion of each of said standards 7 bearing against the outer side face of the adjacent disk. Spiral springs 18 are connected with the said members F to hold the disks 4 in bearing contact with the standards 7. To prevent the rear end of said springs from pressing the said disks together, flexible members in the form of short pieces of chain 8 are fastened to said springs 6 at one end and to the rear frame A at the other end. Curved bars 9 are provided to guide the foliage of the beets and each of said bars is fastened at its front end to one of the said runners B and extends toward the rear of the machine and is curved inwardly and upwardly in order that the rear end of each may be positioned between said disks 4. The topping knife 11 is also mounted on the rear of said frame D and the vertical standard 12 is provided by which the said knife may be vertically adjusted.

The operation of my machine is as follows:—

With the frames A attached to a tongue projecting past them from the front of the frame of the digging element by the hooks C and riding on the runners B, the machine is drawn along and over a row of beets with my machine in front of the plow or beet lifting parts of the digging element. The foliage of the beets is raised gradually at its outer ends by the bars 9 and as the foliage and crown of the beet pass between the said springs 6 the lower end portions of said controller frames F are moved to the right or left as the individual beet directs, thereby centering the beet between the disks 4 which are spaced apart by the chains 8.

The flexibility of the chains 8 allows the position of either of said springs 6 to be shifted outwardly but not to get any closer to the other spring than the limit of its chain. The edges of said disks cut down into the crown of the beet as far as the flanges 5 will permit while the foliage is held up by the bars 9 and as the said frame D is hingedly fastened to the front one of said frames A the said frame D and all of the elements secured thereto, to-wit the disks 4 and the topping knife 11, are carried by said disks up or down as said disks pass through and over the crown of the beet, thereby adjusting the knife 11 relative to the crown of the individual beet, and cutting the crown from the body of the beet as desired and on the plane of the periphery of said disks as they pass through the crown of the beet. If the crown of the beet is high relative to the ground the knife will pass through the body of the beet high while if the beet grows low in the ground the knife will top it low.

I have thus shown and described my invention which consists of new and novel means of centering the beet between the cutting disks and novel means of adjusting the topping knife to the body of the beet.

I desire to secure by Letters Patent and claim:—

1. In a beet topping machine a frame carried on runners; curved bars fastened to said runners to raise the foliage of beets off of the ground and direct it between cutting disks; a rear frame hingedly connected to said frame; a U-shaped member swivelly mounted on the second mentioned frame; disks journaled on the legs of said U-shaped member; a flange on each of said disks; opposed curved springs fastened at one end to said first mentioned frame; a controller standard fastened on the rear end of each of said springs adapted to bear against the outer side face of the adjacent disk; flexible chains each of which is secured at one end to one of said curved springs to adjust the space between said springs at their rear ends; and a topping knife mounted on the rear of the second mentioned frame adapted to be moved vertically by said disks as they pass through and over the crown of the beet.

2. A beet topping machine comprising a frame adapted to be fastened on a beet digging machine; an inverted U-shaped member swivelly mounted in said frame; cutting disks journaled on the legs of said U-shaped member; a gage flange on each of said disks; a horizontally disposed knife secured on said frame adapted to be moved vertically by said disks as they pass over the crown of the beets; curved springs secured at one end to said frame and spaced apart at the other end and adapted to press against growing beets to shift said frame laterally and thereby guide the said disks over the beets; and curved foliage rods to raise the foliage of the growing beets and direct it between said disks.

3. A beet topping machine comprising a frame mounted on runners; a U-shaped member adapted to be moved laterally at its lower extremity; disks journaled on the legs of said U-shaped member; springs secured at one end to said frame and adapted to press the sides of a beet while it is in the ground to regulate the lateral position of said disks relative to said beet; opposed flanges on said disks to regulate the depth to which said disks may cut; and a topping knife mounted on said frame adapted to cut the crown from said beet on a horizontal plane vertically determined by the flanges of said disks passing over the crown of the beet.

4. A beet topping machine comprising a frame mounted on runners and connected at one end to beet digging elements; curved springs secured to said frame and adapted to press against the sides of beets growing in a row; spaced apart disks mounted on said frame and laterally movable by said curved springs; and a topping knife mounted on one end of said frame adapted to be moved vertically by said disks passing through the crown of a beet.

In testimony whereof I have affixed my signature.

MARION A. SMITH.